United States Patent
Rolston et al.

(10) Patent No.: US 10,677,384 B2
(45) Date of Patent: Jun. 9, 2020

(54) PUSH PULL DOUBLE SWIVEL COUPLER

(71) Applicant: Stucchi USA, Inc., Romeoville, IL (US)

(72) Inventors: Scott A. Rolston, Naperville, IL (US); Jay Prins, Mokena, IL (US)

(73) Assignee: Stucchi USA, Inc., Romeoville, IL (US)

( * ) Notice: Subject to any disclaimer, the term of this patent is extended or adjusted under 35 U.S.C. 154(b) by 465 days.

(21) Appl. No.: 15/388,777

(22) Filed: Dec. 22, 2016

(65) Prior Publication Data

US 2018/0180209 A1 Jun. 28, 2018

(51) Int. Cl.
| | | |
|---|---|---|
| F16L 39/04 | (2006.01) | |
| F16L 39/06 | (2006.01) | |
| F16L 37/52 | (2006.01) | |

(52) U.S. Cl.
CPC .............. F16L 37/52 (2013.01); F16L 39/04 (2013.01); F16L 39/06 (2013.01)

(58) Field of Classification Search
CPC . F16L 37/52; F16L 39/04; F16L 39/06; F16L 57/00; F16L 21/06; F16L 27/02; F16L 3/01; F16L 3/10; F16L 3/1091; F16L 3/16; F16L 3/22; F16L 47/04
USPC .......... 285/304, 1, 24, 28, 33, 62, 87, 121.6, 285/145.2, 147.1, 272, 425, 121.3, 148.1, 285/148.8, 419; 280/421
See application file for complete search history.

(56) References Cited

U.S. PATENT DOCUMENTS

| | | | |
|---|---|---|---|
| 3,125,359 A | 3/1964 | Charles | |
| 3,176,730 A | 4/1965 | Knight | |
| 3,937,498 A | 2/1976 | Weinhold | |
| 3,966,239 A | 6/1976 | Heckenkamp | |
| 3,981,329 A * | 9/1976 | Wohlwend | F16L 39/00 |
| | | | 137/615 |
| 4,269,226 A | 5/1981 | Allread | |
| 4,730,850 A | 3/1988 | Takahashi | |
| 6,021,823 A | 2/2000 | Hale | |
| 7,478,700 B2 * | 1/2009 | Connelly | F16L 3/16 |
| | | | 180/296 |
| 9,404,605 B2 * | 8/2016 | Booth | F16L 3/1091 |

FOREIGN PATENT DOCUMENTS

EP        0050291 A2    12/1981

* cited by examiner

*Primary Examiner* — Zachary T Dragicevich
*Assistant Examiner* — William S. Choi
(74) *Attorney, Agent, or Firm* — Perkins IP Law Group LLC; Jefferson Perkins

(57) ABSTRACT

A push pull coupler for hydraulic or other line that pivots about two axes in response to a predetermined tensile force exerted by a line connected to an adapter of the coupler, so that a face of the adapter is normal to the predetermined tensile force. A tensile force greater than the predetermined tensile force causes the disconnection of the line from the adapter. In one embodiment, a second push-pull coupler pivots around a third axis different from the first and second axes, responsive to a second predetermined tensile force that doesn't have to be parallel to the first predetermined tensile force. The faces of the couplers' adapters therefore become normal to the respective tensile forces exerted on them prior to disconnection of the lines.

9 Claims, 9 Drawing Sheets

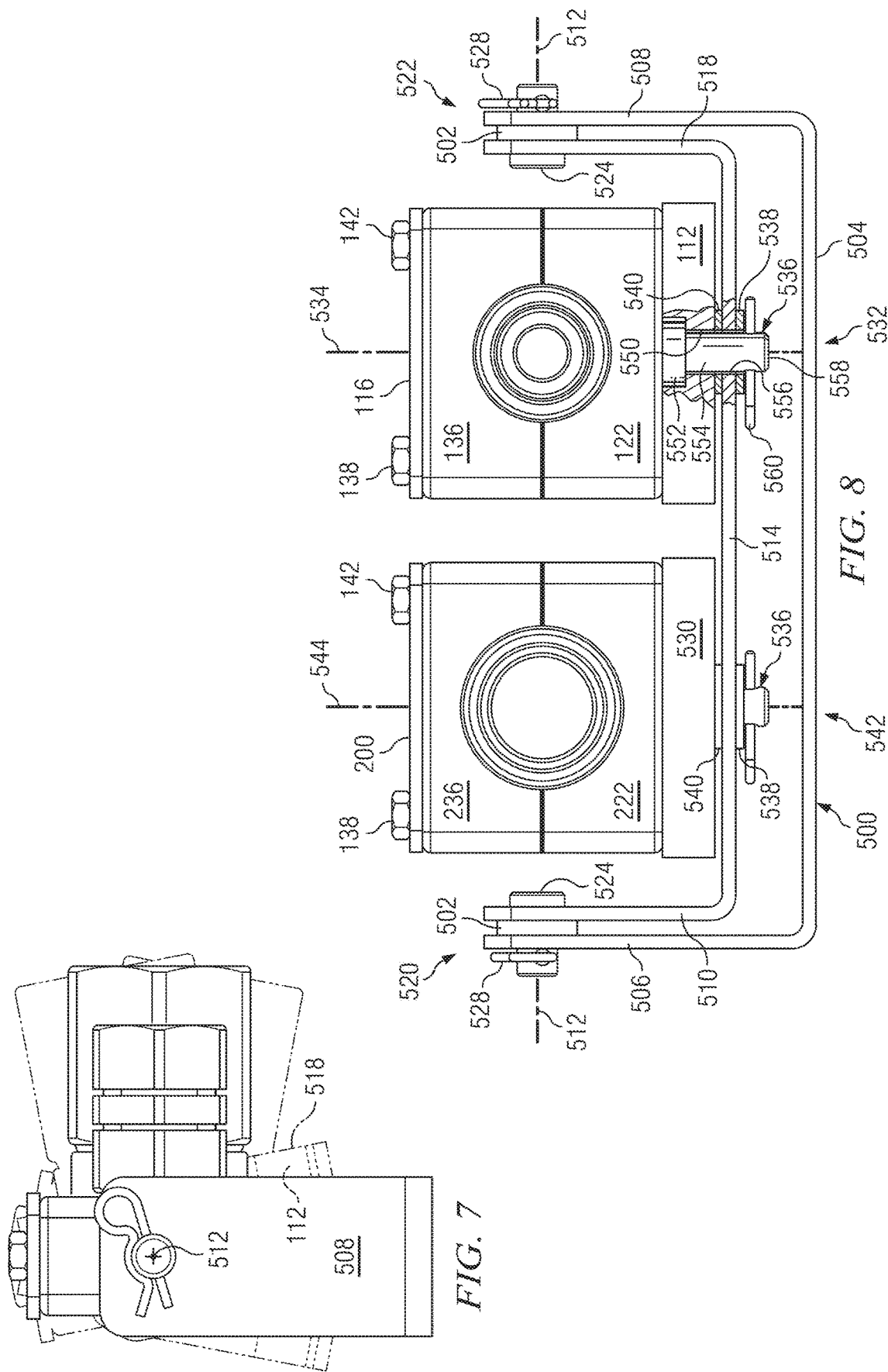

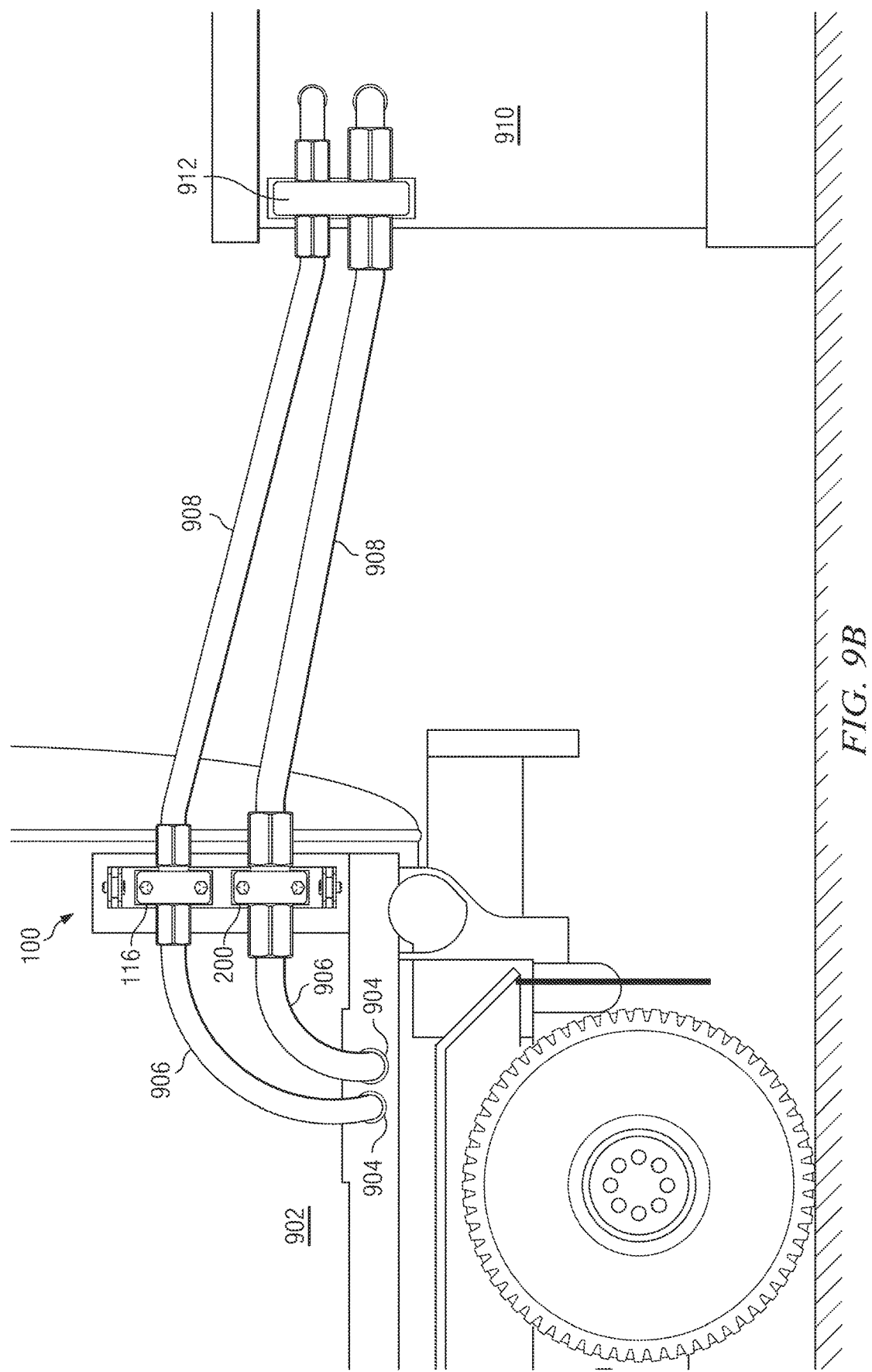

PUSH PULL DOUBLE SWIVEL COUPLER

BACKGROUND OF THE INVENTION

Push-pull couplers are used to provide quick connection and release of various types of lines or hoses such as hydraulic fluid lines and pneumatic hoses. Typically the lines are pressurized. Generally a coupler is fixed to a base, a user connects the lines from a loading dock or other station through the coupler to a container on a vehicle and uploads or discharges the fluid. After the user has completed the delivery to the vehicle, the user may neglect to remove the lines. As the vehicle moves away from the station, the lines are pulled and a failure may occur, resulting in damage to the loading dock, the lines, the coupler and/or the vehicle. The direction of tensile force exerted by the line on the coupler to which it is connected may not be normal to the face of the coupler adapter, causing side loading, nonuniform stresses on the coupler and line and possible damage to either. Similar couplers could be used to connect and disconnect electrical power or signal conductors.

Further, it is often the case that such couplers are provided in pairs, such as couplers for a hydraulic supply line and a hydraulic return line. The couplers may be displaced from one another in such a way that a tensile force exerted by a first line on a first coupler may not be parallel to a tensile force exerted by a second line on a second coupler. In this situation, one or both of the adapter faces will not be normal to the tensile forces exerted by the lines and a tensile force along one line may be greater in magnitude than a tensile force exerted along the second line. The first line may be cleanly pulled out of the first adapter along a direction normal to its face, but the second line might be pulled out at angle to the second face, causing damage to the line or adapter. Damage to the hydraulic lines or adapters may cause fluid spillage and other hazards. There is thus a need to minimize the damage caused by inadvertent disconnection of fluid lines by physical displacement of a vehicle from a station.

SUMMARY OF THE INVENTION

According to one aspect of the invention, a push-pull coupler is provided that has a base with a pivot bracket attached along a first axis with a first swivel to the base. At least one coupler is connected by a second swivel to the pivot bracket along a second axis disposed at an angle to the first axis. The coupler has an adapter for receiving an end of a line, a face of the adapter being disposed at an angle to the first and second axis. Upon the exertion of a predetermined tensile force by the connected line, the coupler will pivot such that the face of its adapter will be normal to the predetermined tensile force. When a tensile force more than the predetermined tensile force is exerted by the line on the adapter, the line will disconnect from the adapter.

In one embodiment, a second push-pull coupler is attached to the pivot bracket by a third swivel disposed on a third axis different from the second axis. An adapter of the second coupler receives a second line. Upon the exertion of a second predetermined tensile force by the second line on the second adapter, a face of the second adapter will pivot until it is normal to the second predetermined tensile force. When a tensile force greater than the second predetermined force is exerted by the second line on the second adapter, the second line will disconnect from the second adapter. The vector of the second predetermined tensile force doesn't have to be parallel to the vector of the first predetermined tensile force and the individual articulation of the first and second adapters means that their faces can be normal to these respective forces, and possibly at an angle to each other. This assures clean disconnections of the lines from the couplers very close to each other in time, preventing damage to the lines and the couplers.

In another embodiment, first and second couplers are each affixed to a common plate. The common plate is attached to the pivot bracket by a second swivel and the pivot bracket is attached to the base by at least a first swivel, as before. In this embodiment, the first and second couplers will pivot around the first and second axes as a unit responsive to predetermined tensile forces exerted by the first and second lines.

In a method according to the invention, a pivot bracket is mounted to a base using a first swivel disposed on a first axis. At least one push-pull coupler is mounted to the pivot bracket using a second swivel disposed on a second axis that is at an angle, such as a right angle, to the first axis. A line is inserted into a face of an adapter of the push-pull coupler. The line is actuated to deliver a hydraulic or pneumatic fluid, electrical energy or a signal to the push-pull coupler. After the completion of this delivery, at least a predetermined tensile force is exerted by the connected line on the adapter. Responsive to this predetermined tensile force, the push-pull coupler will pivot until the face of its adapter is normal to the predetermined tensile force. When a tensile force greater than the predetermined tensile force is placed on the adapter by the connected line, the connected line will cleanly disconnect from the push-pull coupler.

In one embodiment, a second push-pull coupler is mounted to a pivot bracket by a third swivel along a third axis different from the first and second axes. In operation, a second line is inserted into a face of an adapter of the second coupler, and is used to transmit to or receive from the second adapter hydraulic or pneumatic fluid, electrical energy or a signal. At the conclusion of the delivery or reception from the second coupler of the fluid, electrical energy or signal, a second predetermined tensile force is exerted on the second push-pull coupler. Responsive to the exertion of the second predetermined tensile force, a face of the adapter of the second push-pull coupler pivots to a position normal to the second predetermined tensile force. The vectors of the first and second predetermined tensile forces often will not be parallel to each other but the third swivel permits an articulation of the second coupler that is independent of the articulation of the first coupler, so that the faces of the couplers are normal to the respective tensile force vectors exerted by the connected lines. When a force greater than the first and second predetermined forces is exerted on the first and second lines, the first and second lines will disconnect from the first and second couplers, more cleanly and more closely in time to each other, mitigating damages to the lines and couplers.

The present invention has particular application to pneumatic and hydraulic lines, but also has application to lines that carry electrical energy or signals. The present invention has application to situations in which a vehicle is connected by one or more lines to another vehicle or to an immobile platform, station or base, such that when the vehicle moves away from the station or other vehicle, tension on the lines will arise. As e.g. the vehicle drives away from the station, the lines will disconnect from the adapters more cleanly, with less overall force and closer together in time, mitigating damage to the lines and the couplers.

BRIEF DESCRIPTION OF THE DRAWINGS

Further aspects of the invention and their advantages can be discerned in the following detailed description, in which like characters denote like parts and in which:

FIG. 7 is a side view of the embodiment shown in FIG. 6;

FIG. 8 is a front view of the embodiment shown in FIGS. 6 and 7;

FIGS. 9A-9D are side elevational views showing successive stages in a line disconnection method sequence according to the invention.

DETAILED DESCRIPTION

Figure 1:
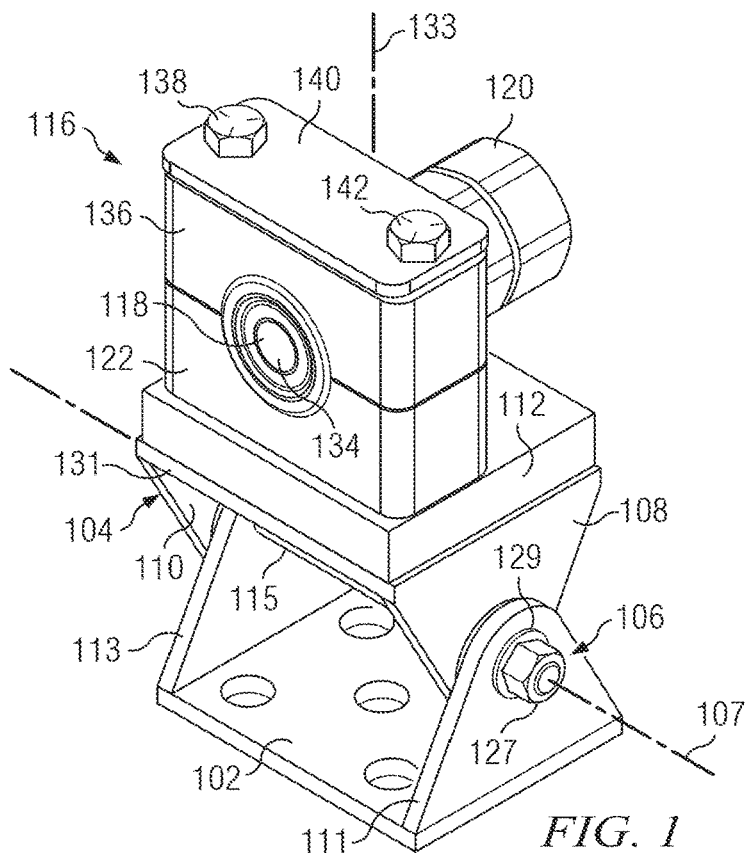
FIG. 1 is a perspective view of a first embodiment of the invention in which a push-pull coupler has a single adapter.

An isometric view of a first embodiment of the invention is shown in FIG. 1. A base plate 102 can be attached to a stationary or mobile object (such as a vehicle) as by being welded or bolted.

Figure 4:
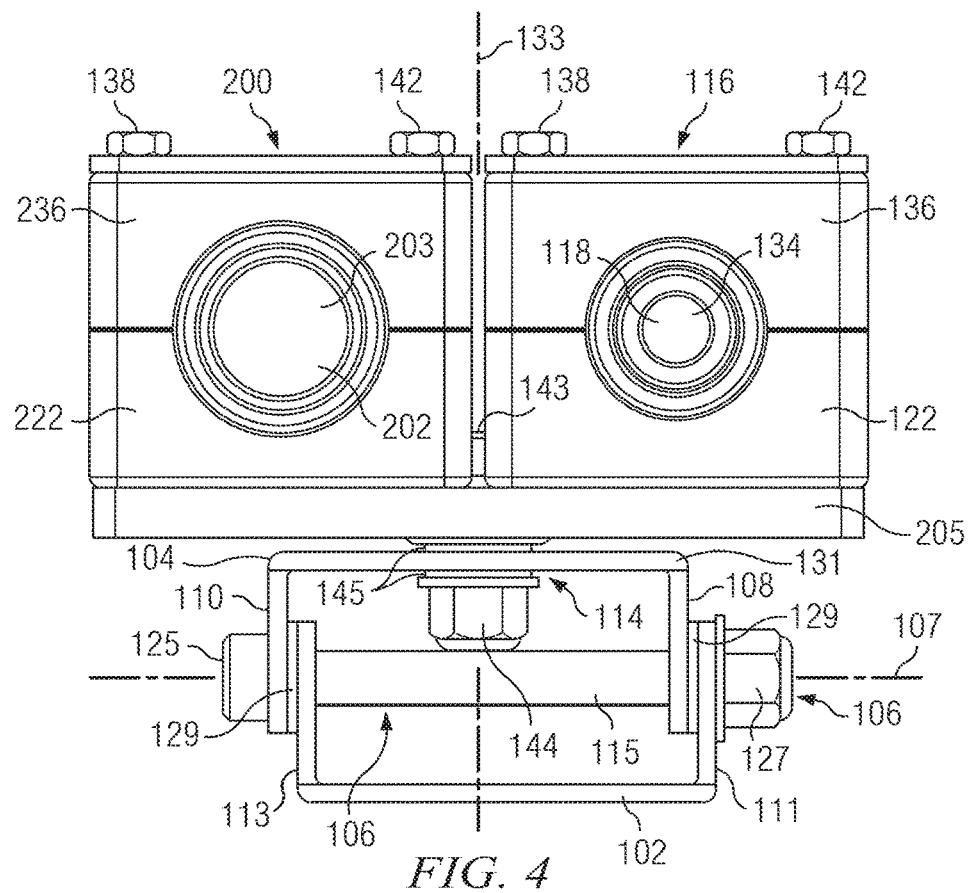
FIG. 4 is a front view of the embodiment shown in FIG. 2.

The base plate 102 is pivotally connected to a pivot bracket 104 with a first swivel 106 that is disposed along a first axis 107. First axis 107 may be horizontal, as shown, but may also be vertical or at an angle in between, depending on the attitude of base plate 102 after it has been affixed to other structures. In the illustrated embodiment, the pivot bracket 104 is U-shaped and has first and second opposed ends 108, 110. In the illustrated embodiment, the base plate 102 likewise is U-shaped and has opposed ends 111, 113. The swivel 106 includes a bolt 115 (see the view of the related embodiment in FIG. 4) that is inserted along axis 107 through a hole in pivot bracket end 110, a hole in base plate end 113, a hole in pivot bracket end 108, and a hole in base plate end 111. The bolt 115 may have a bolt head 125 (as shown in FIG. 4) and an opposed end threaded to a nut 127. Washers 129 may be disposed on the bolt 115 between pivot bracket end 110 and base end 113, and between pivot bracket end 108, and base plate end 111 respectively. In this embodiment, nut 127 may be tightened on bolt 115 so that the pivot bracket 104 does not swing freely around axis 107 relative to base 102, but only responsive to a predetermined amount of torsion. In other embodiments, such as the embodiments shown in FIGS. 5-8, the pivot bracket swivels freely relative to the base bracket.

In other embodiments, the pivot bracket may be L-shaped and have only have a single end 108 or 110 that downwardly extends from a horizontal plate 131, and only a single point of rotational affixation to an end 111 or 113 of an L-shaped base plate 102.

Figure 3:
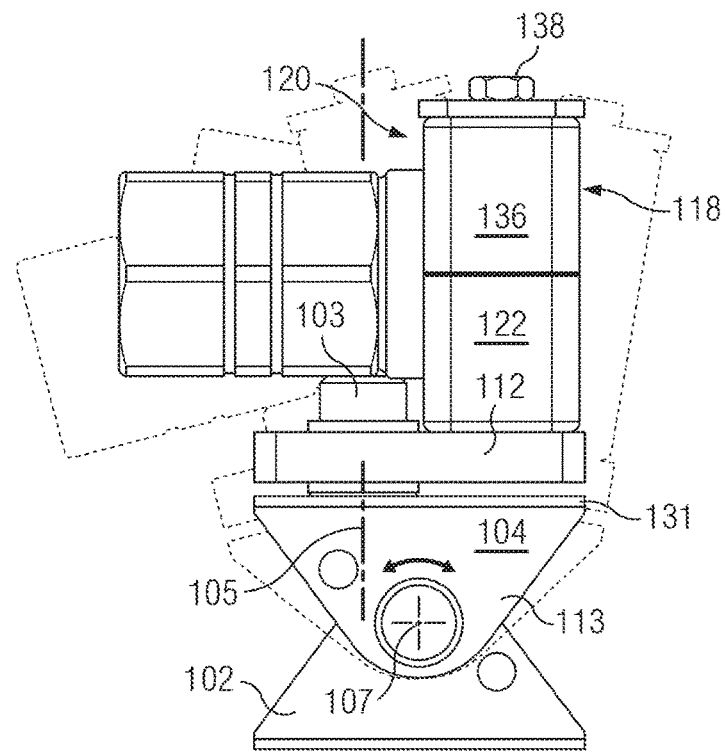
FIG. 3 is a side view of the embodiment shown in FIG. 2.

A coupler plate or support 112 is attached to the horizontal plate 131 of pivot bracket 104 by a second swivel 114 (as shown in the related embodiment illustrated by FIGS. 3 and 4). The second swivel 114 is formed on a second axis 133 that is disposed at an angle to the first axis 107, such as 90 degrees. The second swivel 114 may consist of a bolt 143 that is received in a hole in the coupler plate 112 and a corresponding hole in the horizontal pivot bracket plate 131. A washer 145 and a nut 144 may be threaded onto the end of the bolt 143 that extends through these holes (as shown in FIG. 4).

The coupler plate 112 attached to the second swivel 114 has mounted to it at least one coupler 116. Prior to the connection of a hose (not shown) to rear end 120, the coupler 116 can rotate 360° around the second axis 133. In the embodiment shown in FIG. 1, only one coupler 116 is attached to the coupler plate 112. The coupler 116 can be attached to the coupler plate 112 so that the coupler plate 112 and coupler 116 move together when rotating around axes 107 and 133.

The coupler 116 includes an adapter 134 that has front face 118 and a rear end 120. The front face 118 of the adapter 134 receives a hose end (not shown in this FIGURE; see FIGS. 9A-9D) with a push-pull, quick release connector. The rear end 120 of the adapter 134 may take the form of a female screw-threaded nut that receives a conventional male screw threaded hose end (not shown; see FIGS. 9A-9D). The adapter 134 can be a female face adapter. The adapter 134 can range in body size from about ⅛ inch to about 1½ inch. The adapter 134 may have a predetermined disconnect force in the range of 25-70 N.

In the illustrated embodiment the adapter 134 is clamped into place between a bottom clamp half 122 having an upwardly facing semicylindrical surface, and a top clamp half 136 having a downwardly facing semicylindrical surface. A left clamping bolt 138 is inserted through a hole in a top clamp plate 140, through respective bores in the bodies of each of the top and bottom clamp halves 136, 122 that are disposed to the left of the adapter 134, and is then screwed into a threaded bore in coupler plate 112. A right clamping bolt 142 is inserted through a further, respective hole in the top clamp plate 140, through respective bores in the top and bottom clamp halves 136, 122 that are disposed to the right of the adapter 134, and then screwed into a further threaded bore in the coupler plate 112.

Figure 2:
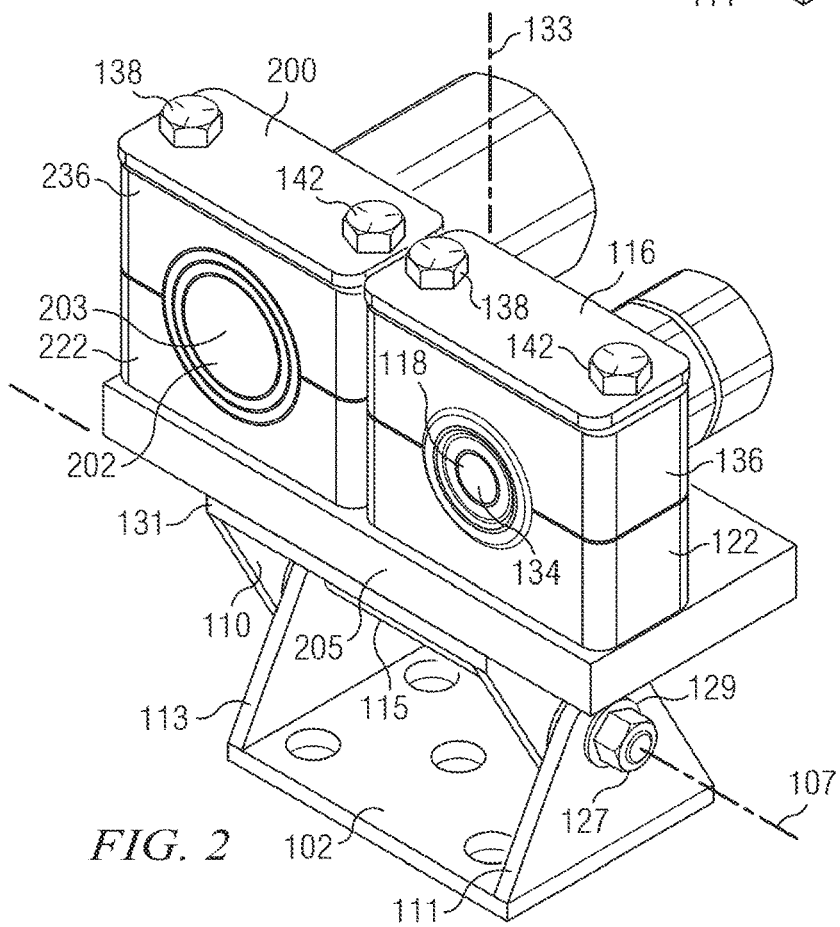
FIG. 2 is a perspective view of a second embodiment similar to that shown in FIG. 1, but including a second adapter.

In an embodiment shown in FIGS. 2-4, a first coupler 116 is provided as described for FIG. 1. A second coupler 200 in general is similar in construction to the first coupler 116. The second coupler 200 may take a hose end that is of a different size than the hose end received by coupler 116. In this embodiment, the couplers 116, 200 are both fastened or bolted in a fixed position to the coupler plate 205 so as to be in a side-by-side relation. The coupler 200 has a female adapter 202 that is meant to receive a male quick-connect hose end (not shown in this FIGURE; see FIGS. 9A-D) with a front face 203. In the illustrated embodiment the front face 203 is coplanar with face 118 of the adapter 134. Adapter 202 is clamped between a bottom clamp half 222 and top clamp half 236.

Plate 205 is attached by the second swivel 114 along axis 133 (FIG. 4). Couplers 116, 200 and coupler plate 205 rotate as a unit around each of swivels 114, 106. In FIG. 3, the end of the first swivel axis 107 can be seen. In this illustrated embodiment, the pivot bracket 104 can swing up to about 180 degrees around the first swivel axis 107 before it is blocked by the base plate 102. In a related embodiment (not shown), where end 108 of pivot bracket 104 is placed to the outside of end 111 of the base plate 102, the range of rotation might be enhanced.

Figure 5:
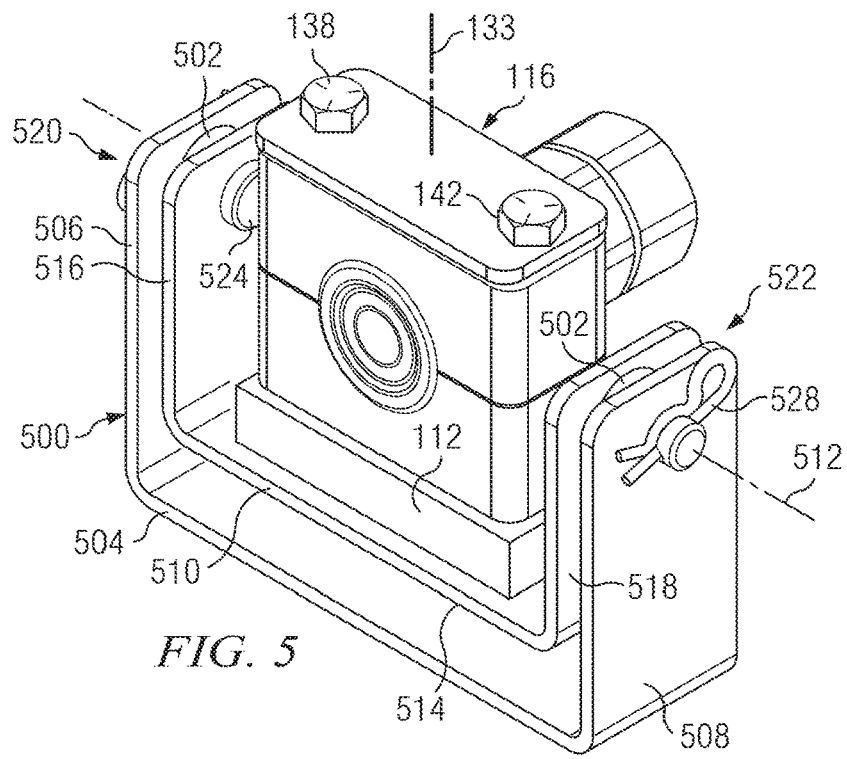
FIG. 5 is a perspective view of a third embodiment of the invention, showing a push-pull coupler having a single adapter.

In the one-coupler embodiment seen in FIG. 5, a u-shaped base bracket 500 has an attachment plate 504 disposed between an upstanding left end 506 and an upstanding right end 508. A u-shaped pivot bracket 510 is pivotally attached to the base bracket 500 around an axis 512. The pivot bracket 510 has a base plate 514, a left end 516 that upwardly extends from a left end of the base plate 514, and a right end 518 that upwardly extends from a right end of the base plate 514. The left end 506 of the base bracket 500 is connected to the left end 516 of the pivot bracket 510 by a first swivel 520. The right end 508 of the base bracket 500 is connected to the right end 518 of pivot bracket 510 by a second swivel 522. While the illustrated pivot bracket 510 is u-shaped, pivot bracket 510 is limited in its shape only by its ability to pivot freely about axis 512.

As best seen in the related embodiment shown in FIG. 8, The swivels 520, 522 may each be composed of a non-threaded bolt 524 that is inserted through a hole in an end of the pivot bracket 510, a spacer 502 to keep pivot bracket 510 from rubbing against base bracket 500, and a hole in a corresponding end of the base bracket 500. The bolt 524 may be of the type that is fastened in place by a clevis pin 528, as shown. Other components, such as threaded bolts or bolts with grooves for snap rings, could be used instead to constitute swivels 520, 522. The swivels 520, 522 should both be disposed on axis 512.

A bottom coupler plate 112 is pivotally attached to the pivot bracket 510. The coupler plate 112 is free to rotate around a swivel 532 (see FIG. 8) that is disposed on an axis 534. Axis 534 is at an angle to axis 512, such as 90 degrees. The swivel 532 may comprise any attachment means that allows the coupler plate 112 to fully rotate. In the related embodiment illustrated in FIG. 8, the swivel 532 consists of a bolt or pin 536 that is downwardly inserted through a bore 550 in the plate 112. The bore 550 is countersunk so as to receive an enlarged head 552 of the swivel bolt 536. A shaft 554 of the swivel bolt 536 is inserted through a first washer 540, a bore 556 in the pivot bracket 510 and a second washer 538. An end 558 of the bolt 536 may be provided with a transverse hole to receive a clevis pin 560. In other embodiments, the smooth bolt 536 and clevis pin 560 may be replaced with a threaded shaft and a nut (not shown). A coupler 116 as described in FIGS. 1-4 is affixed to the coupler plate 112 and, prior to the attachment of hoses to it, is capable of rotating 360° around an axis 534.

Figure 6:
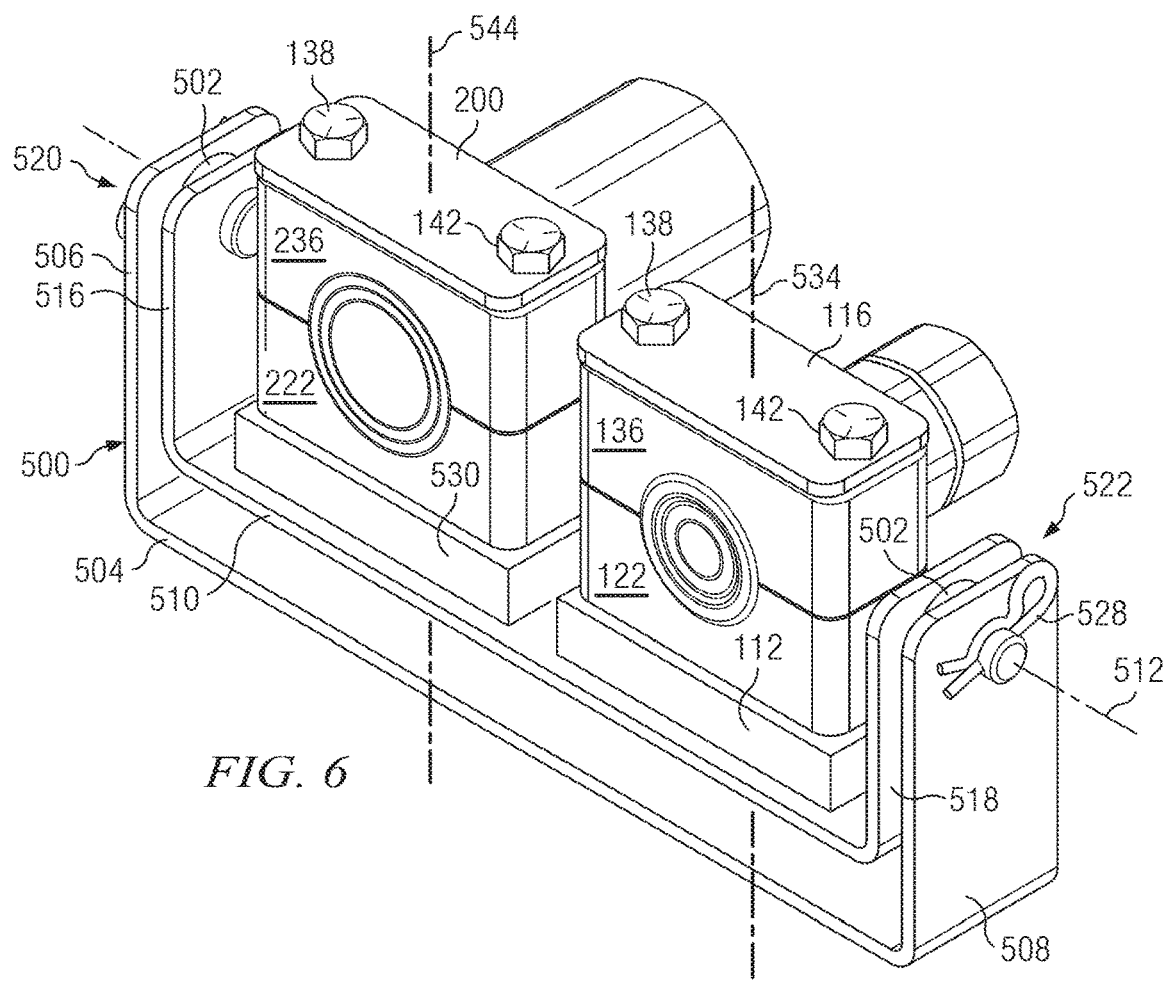
FIG. 6 is a perspective view of a fourth embodiment of the invention similar to that shown in FIG. 5, but including two adapters.

The two-coupler embodiment particularly shown in FIGS. 6 and 8 is similar to the embodiment shown in FIG. 2 but with the following differences. A first coupler 116 is provided as described in FIG. 5. The first coupler 116 is joined by a second coupler 200 that in general is similar in construction to the first coupler 116. The second coupler 200 may take a hose end that is of a different size than the hose end received by coupler 116. The first coupler 116 is attached by a swivel 532 and, prior to the connection of hoses to it, can rotate 360° around an axis 534. The second coupler 200 is attached by a swivel 542 and, prior to the connection of hoses to it, can rotate 360° around an axis 544. The axis 534 may be generally parallel to the axis 544. The first coupler 116 is able to rotate around axis 534 independently from the rotation of second coupler 200 around axis 544.

There can be more than two couplers attached to pivot bracket 510. Each additional coupler is able to rotate around an axis that may be generally parallel to axes 534, 544. The two coupler arrangement specifically shown in FIG. 6 can allow coupler 200 to rotate up to about 130° when hoses are attached, and coupler 116 can rotate up to about 135° with hoses attached. After connection of the hoses, the rotation of couplers 116, 200 are limited only by the length of the base plate 514 and the hose sizes; the couplers can rotate until stopped by a hose contacting the right or left ends of the pivot bracket.

Figure 9A:
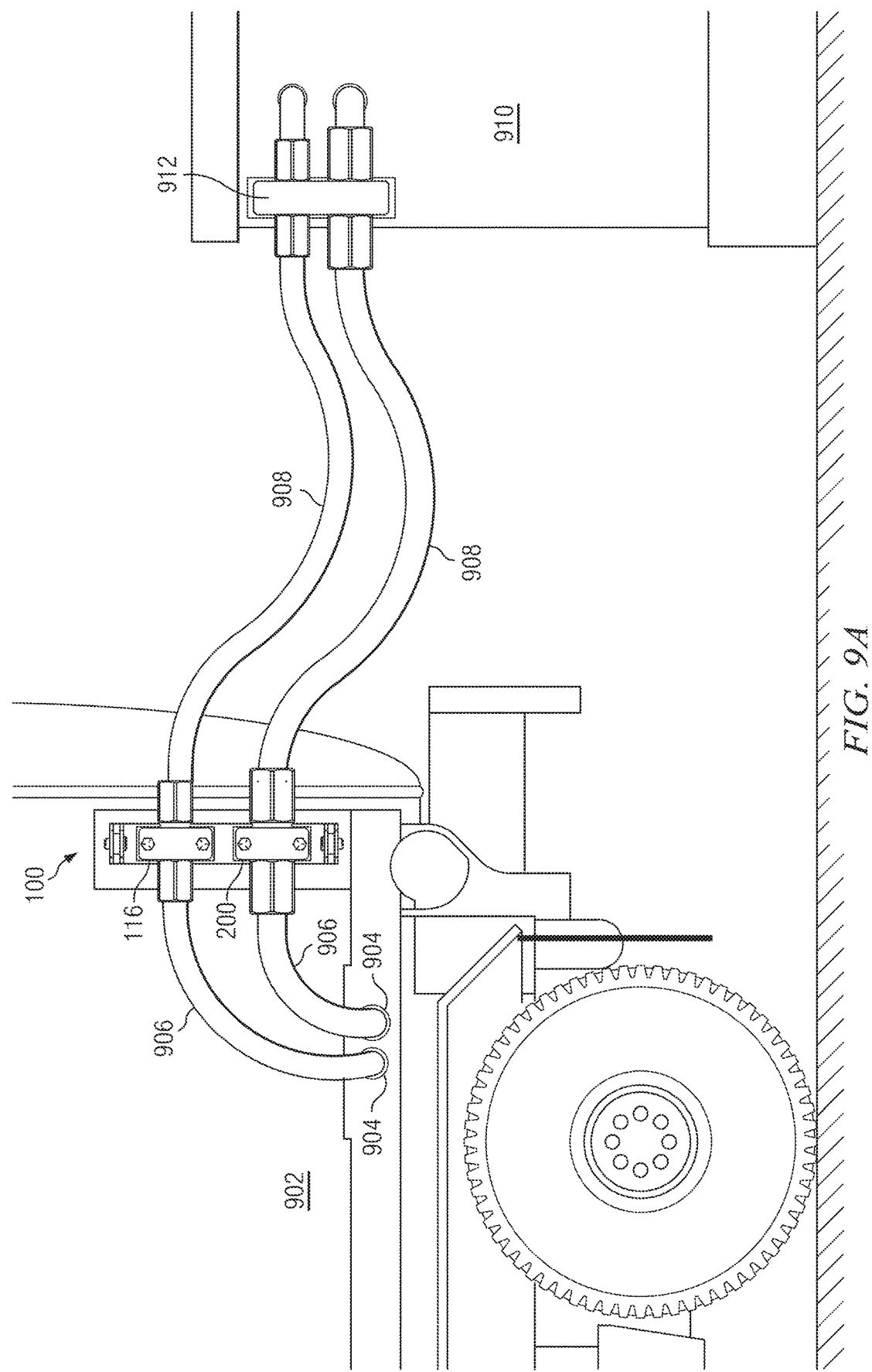

FIGS. 9A-D illustrate one embodiment of the invention in use in an environment that includes a vehicle that moves relative to a vehicle loading dock. In FIG. 9A, a push pull coupler system 100 is shown attached to a vehicle 902. The vehicle 902 can be any type of land vehicle such as a tanker truck or other vehicle with inlet ports 904. Vehicle 902 alternatively can be a water or air vehicle. In FIG. 9A, two hoses or lines 906 are attached from the vehicle inlets or ports 904 to couplers 116, 200 mounted on the vehicle 902. It will be recognized that any number of hoses 906 and couplers 116, 200 may be used depending upon the number of ports 904. Hoses or lines 908 are attached from the quick-connect faces of couplers 116, 200 to a port 912 at a station 910. The hoses 908 can be of different lengths and sizes. One or more hoses 908 may be connected. Once the hoses 908 are attached to the connectors, liquids or gases are fed through the hoses or lines 908. Generally, lines 908 may move fluid in opposite directions or in the same direction. In one application, lines 908 may transport hydraulic fluid in which case one of lines 908 could be a hydraulic supply line and the other of lines 908 could be a hydraulic return line. Once the filling or other fluid process is completed, and prior to the vehicle pulling away, the user may fail to disconnect the hoses 908 from the coupler system 100.

Figure 9C:
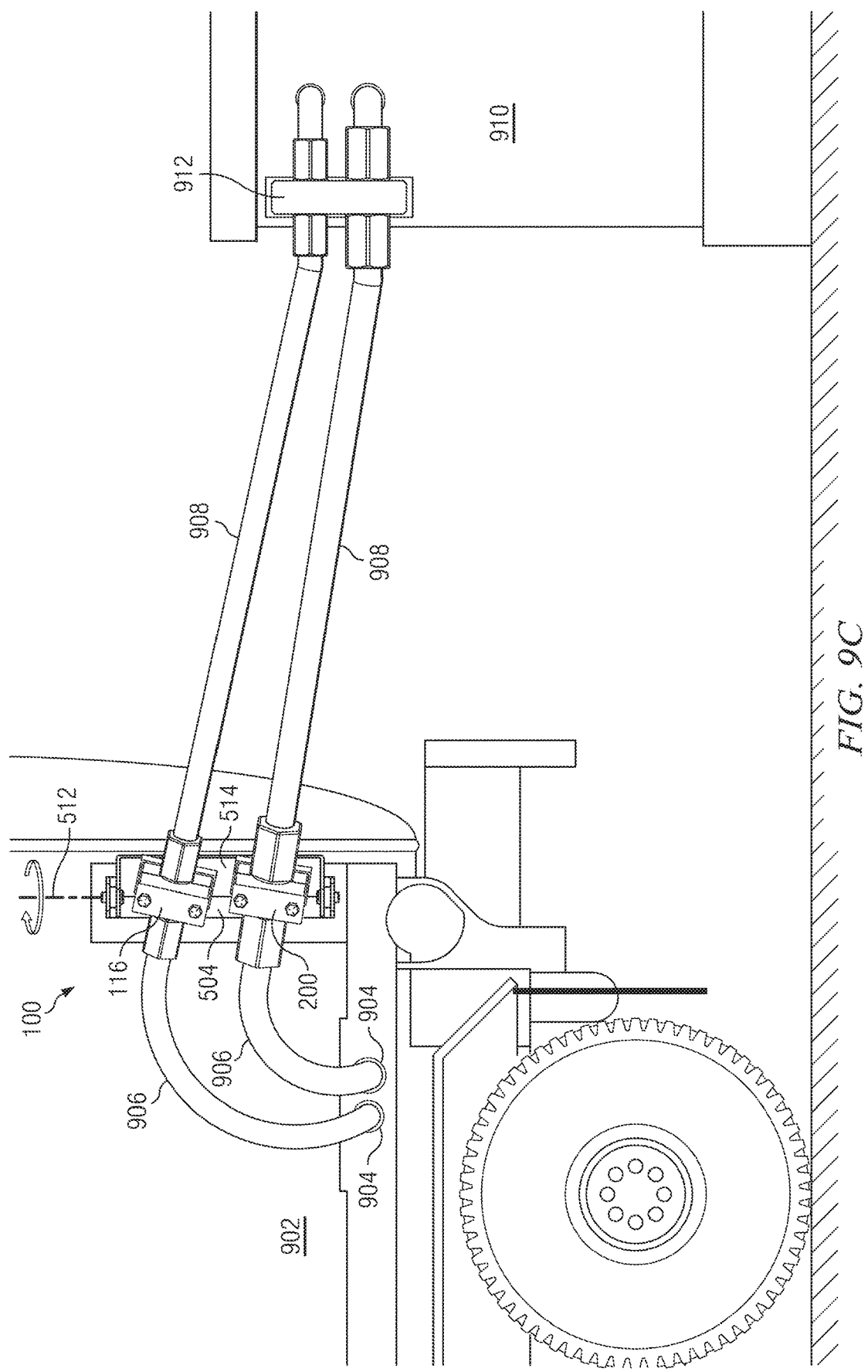

In FIG. 9B vehicle 902 begins to pull away from station 910. As the vehicle 902 starts to move, tension is created in the hoses 908 and the hoses 908 are pulled taut against the couplers 116, 200. In FIG. 9C the couplers 116, 200 are seen to align in response to the tensile forces exerted on each of the couplers by the respective connected hoses 908. Each coupler 116, 200 independently pivots around two axes until its face is normal to the particular tensile force it is experiencing. After such pivoting, the coupler faces may no longer reside in planes that are parallel to each other but may be canted with respect to each other. The ability of the couplers 116, 200 to independently pivot and swivel around two axes (axis 512 and the respective bracket/coupler axis) allows the couplers 116, 200 to align independently in response to the tensile forces.

Figure 9D:
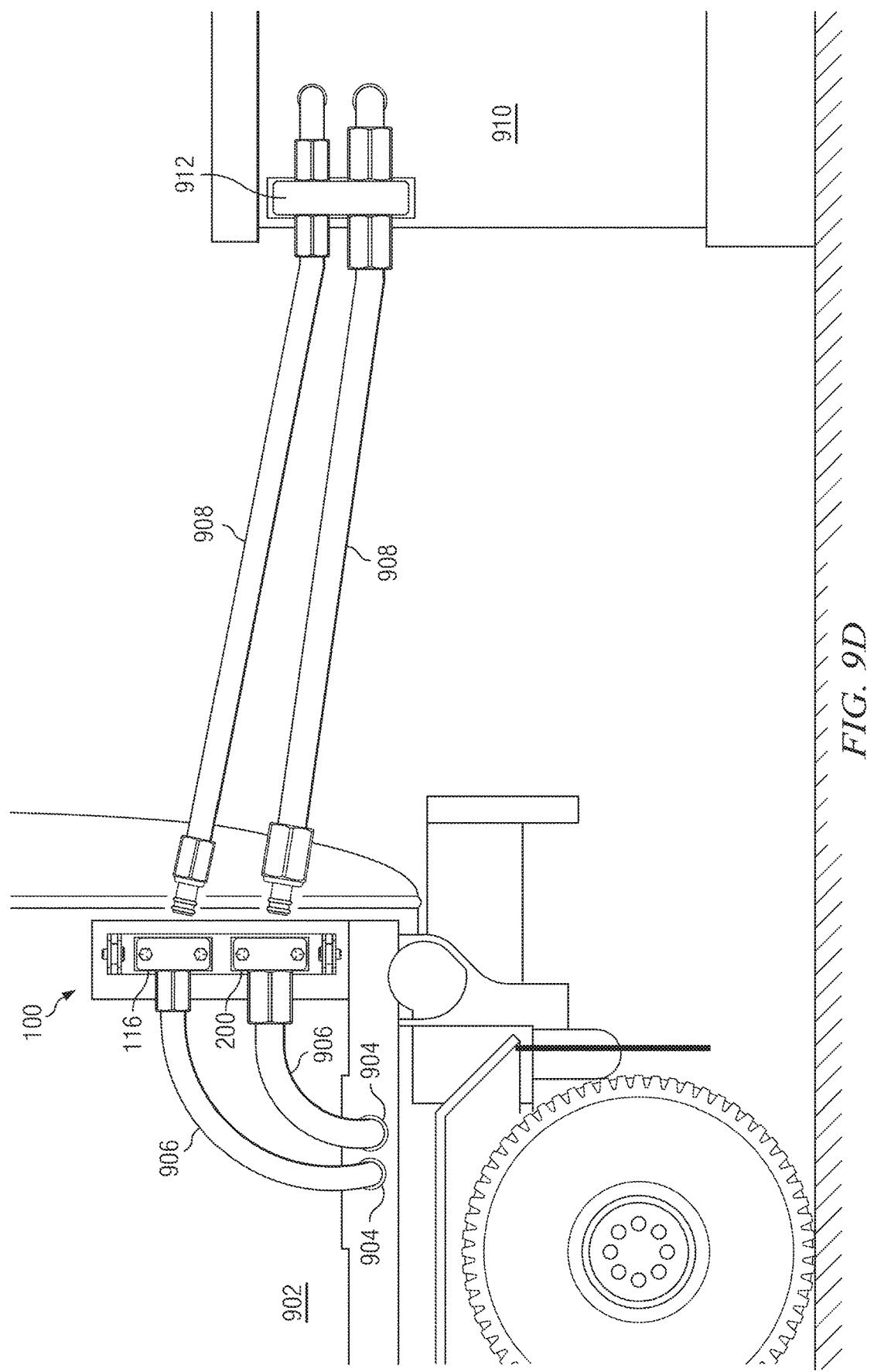

FIG. 9D shows the hoses 908 disconnecting from the couplers 116, 200 independently from one another. Each hose 908 will pull out in a direction normal to its respective coupler face and may pull out at a time different from the other hose(s). In this attitude, the pull-out force will be minimum and will not have any side load component. Absent the invention, the failure of the coupler face to be normal to the tensile force exerted by the hose could increase the total disconnect force, may cause the disconnecting hose to move in an unpredictable direction, and may damage the hose coupling. Disconnection from properly aligned faces of couplers 116, 200 may also decrease hose whip.

Figure 10:
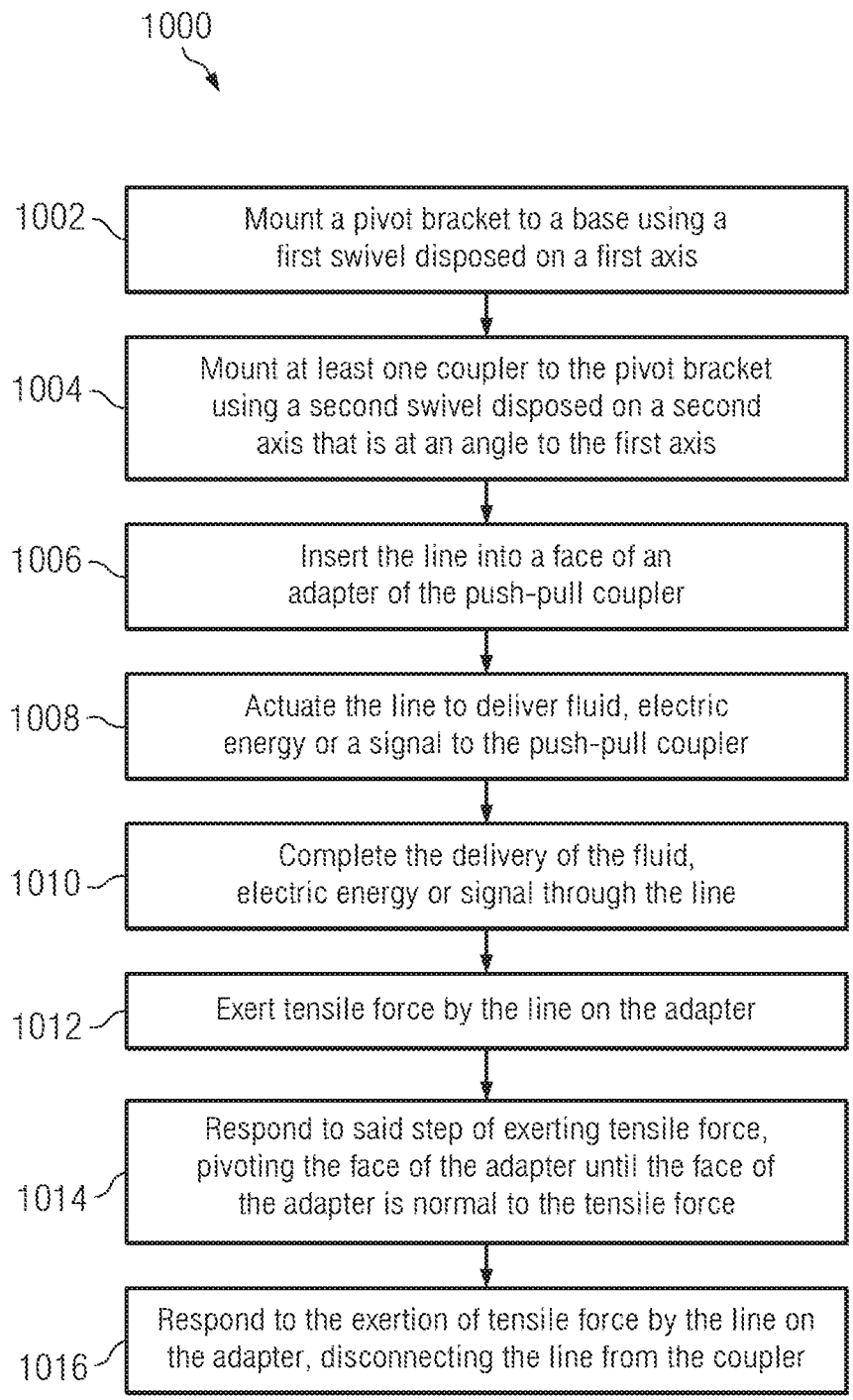
FIG. 10 is a flow chart showing steps in a method of connection and disconnection according to one embodiment of the invention.

As shown in FIG. 10, in a method (1000) according to the invention, a pivot bracket is mounted (1002) to a base using a first swivel disposed on a first axis. At least one push-pull coupler is mounted (1004) to the pivot bracket using a second swivel disposed on a second axis that is at an angle, such as a right angle, to the first axis. A line is inserted (1006) into a face of an adapter of the push-pull coupler. The line is actuated (1008) to deliver a hydraulic or pneumatic fluid, electrical energy or a signal to the push-pull coupler. After the completion of this delivery or operation, at least a predetermined tensile force (1012) is exerted by the connected line on the adapter. Responsive to this predetermined tensile force, the push-pull coupler will pivot (1014) until the face of its adapter is normal to the predetermined tensile force. When a tensile force greater than the predetermined tensile force is placed on the adapter by the connected line (1016), the connected line will cleanly disconnect from the push-pull coupler.

In summary, a push pull coupler for hydraulic, pneumatic or other lines is described that pivots about two axes in response to a predetermined tensile force exerted by a line connected to an adapter of the coupler, so that a face of the adapter is normal to the predetermined tensile force. A tensile force greater than the predetermined tensile force causes the disconnection of the line from the adapter. In one embodiment, a second push-pull coupler pivots around a third axis different from the first and second axes, responsive to a second predetermined tensile force that doesn't have to be parallel to the first predetermined tensile force. The faces of the couplers' adapters therefore become normal to the respective tensile forces exerted on them prior to disconnection of the lines.

While illustrated embodiments of the present invention have been described and illustrated in the appended drawings, the present invention is not limited thereto but only by the scope and spirit of the appended claims.

We claim:

1. A push pull coupler for releasably coupling to respective ends of a plurality of flexible hydraulic or pneumatic lines including first and second lines, the first line having a first end, the second line having a second end, the push pull coupler comprising:

a base;

a pivot bracket attached along a first axis with a first swivel to the base;

a first coupler connected by a second swivel to the pivot bracket along a second axis disposed at an angle to the first axis, the first coupler having a first adapter with a first face for releasably connecting to the first end of the first line, the first face of the first adapter being disposed at an angle to the first and second axes; and a second coupler connected by a third swivel to the pivot bracket along a third axis disposed at an angle to the first axis, the third axis not being coaxial with the second axis, the second coupler having a second adapter with a second face for releasably connecting to the second end of the second line, the second face of the second adapter being disposed at an angle to the first and third axes, such that the second coupler swivels around the third axis independently of the first coupler swiveling around the second axis.

2. The push pull coupler of claim 1, wherein the first adapter pivots responsive to a predetermined first tensile force exerted by the first line connected to the first adapter, such that the first face is normal to the first tensile force, the second adapter pivoting responsive to a predetermined second tensile force exerted by the second line connected to the second adapter, such that the second face is normal to the second tensile force, angular positions of the first face and the second face being different from each other if the first and second tensile forces are not parallel to each other.

3. The push pull coupler of claim 1, wherein the second axis is at a ninety degree angle to the first axis.

4. The push pull coupler of claim 1 wherein at least one clamp forms a portion of the first coupler, the clamp affixed to the pivot bracket.

5. The push pull coupler of claim 1, wherein the pivot bracket is a u-shaped bracket.

6. The push pull coupler of claim 1, wherein the base is a u-shaped bracket, a fourth swivel aligned with the first swivel along the first axis, the fourth swivel connecting the pivot bracket to the base.

7. The push pull coupler of claim 1, wherein the third axis is parallel to the second axis.

8. The push pull coupler of claim 1, wherein the pivot bracket is a u-shaped bracket having a first end and a second end opposed to the first end, the first swivel disposed near the first end of the pivot bracket, a fourth swivel disposed near the second end of the pivot bracket and connecting the pivot bracket to the base, the fourth swivel disposed on the first axis.

9. The push pull coupler of claim 1, further comprising a plate attached to the pivot bracket, wherein the first coupler is affixed to the plate.

* * * * *